May 9, 1961 B. H. TONGUE 2,983,876
ELECTRONIC TUNED CIRCUIT
Filed June 2, 1958 2 Sheets-Sheet 1

INVENTOR.
BEN H. TONGUE
BY Rines and Rines
ATTORNEYS

May 9, 1961 | B. H. TONGUE | 2,983,876

ELECTRONIC TUNED CIRCUIT

Filed June 2, 1958 | 2 Sheets-Sheet 2

INVENTOR.
BEN H. TONGUE

BY *Rines and Rines*

ATTORNEYS 2,983,876

ELECTRONIC TUNED CIRCUIT

Ben H. Tongue, West Orange, N.J., assignor to Blonder-Tongue Electronics, Newark, N.J., a corporation of New Jersey Filed June 2, 1958, Ser. No. 739,184

15 Claims. (Cl. 330—112)

The present invention relates to electronic tuned circuits and, more particularly, to tuned audio-frequency amplifying circuits.

Electron tubes and other electron-relay devices and the like have long been employed as reactance elements in tuned circuits, whereby variation in the amplification of the tube or relay acts as a tuning change in an associated oscillating tank circuit. In accordance with the present invention, however, it has been discovered that an electron tube or similar relay device can be used without a tank circuit as an electronic tuned circuit that can serve as a resonant amplifier, as distinguished from reactance-tube oscillating circuits. Through the connection of appropriate non-resonant network elements to the tube in a manner that produces a rather unusual set of phase and amplitude conditions, the circuit is startingly converted into a resonant amplifying device having the desirable properties of a high-impedance-input amplifier.

Another object of the invention is to provide a simple electronic tuned circuit that is particularly, though not exclusively, adapted for the audio-frequency range.

A further object is to provide in such a tuned amplifying circuit, a single control over both the gain and Q of the circuit.

Other and further objects will be explained hereinafter and will be more particularly pointed out in the appended claims.

Figure 2:
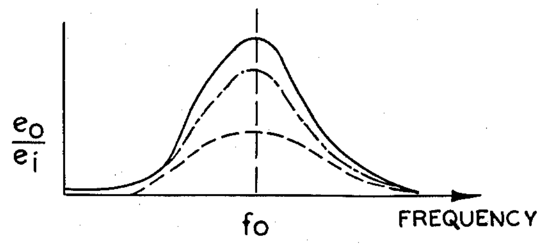
Figure 3:
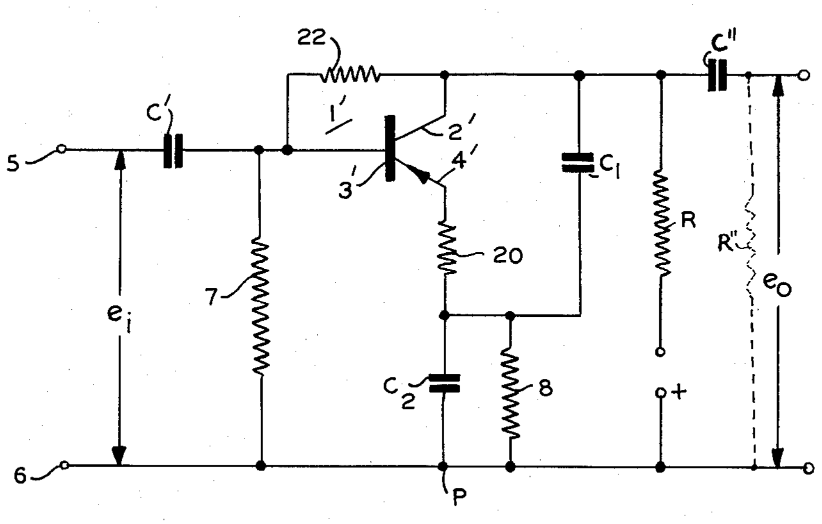
Figure 4:
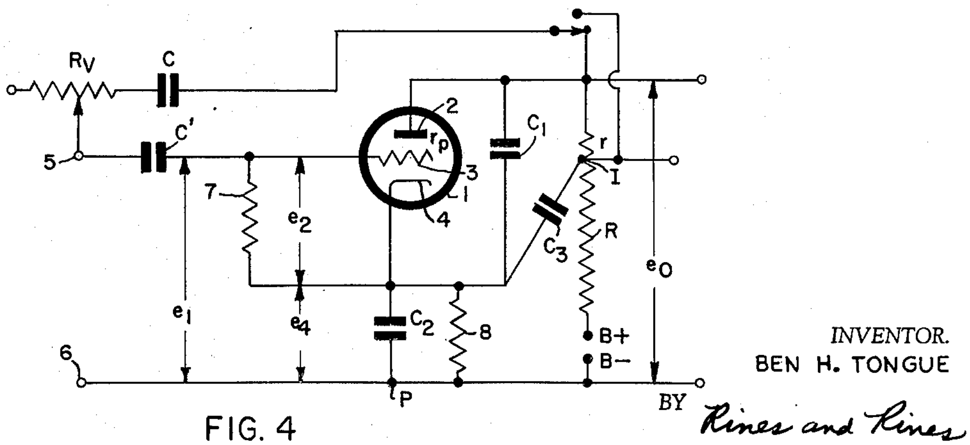

The invention will now be described in connection with the accompanying drawing, Fig. 1 of which is a circuit diagram of a preferred form of the invention; Figs. 3 and 4 are modifications; and Fig. 2 is a reproduction of experimentally obtained graphs illustrating the performance of the circuit of Fig. 1.

Figure 1:
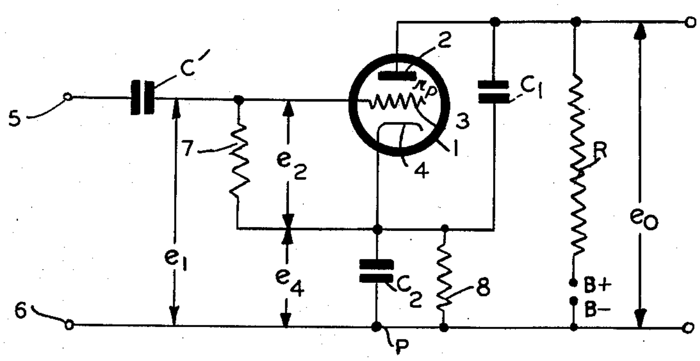

Referring to Fig. 1, it will be observed that the circuit, at first glance, appears superficially to resemble an R-C oscillator, though components essential to provide the necessary and sufficient conditions for oscillation are lacking. Instead, the electron tube or relay 1 is provided with a first time-constant-controlled network comprising the inherent tube anode-circuit resistance $r_p$ and an energy-storage capacitor $C_1$ connected between the anode 2 and cathode 4. A second time-constant-controlled network comprising the further resistance R and the further capacitor $C_2$ is connected between the anode 2, through the anode-supply voltage source B+, B—, and the cathode 4; that is, in parallel with the capacitance $C_1$ of the first network.

It will, of course, be evident, that such a circuit is inherently incapable of oscillating. If it is designed to have certain critical phase and amplitude relationships and is fed with input voltage at a particular location, however, the rather startling result is obtained that the circuit acts as a resonant or tuned amplifying circuit of relatively high Q. While the theoretical explanation for this phenomenon is not presently well understood, it being sufficient to describe the invention as it has been found to work in practice, the necessary conditions have been determined for producing these novel results. These are as follows:

First, the input alternating-current voltage $e_1$, preferably, but not essentially of audio-frequency, is to be applied not at the conventional input circuit between the control electrode 3 and the cathode 4, but, rather, between the terminals 5 and 6 connected, respectively, with the control electrode 3 and an intermediate point P between the capacitor $C_2$ and the resistance R of the second network.

Second, the signal attenuation or loss in each of the networks $r_p$-$C_1$, and R-$C_2$ should be comparable; preferably substantially equal.

Third, the phase shifts produced by both networks should be substantially equal, and the total phase shift of both networks should be such that the voltage $e_4$ developed across capacitor $C_2$, measured from the cathode 4 to the intermediate point P, is about in phase with the voltage $e_2$ measured from the cathode 4 to the control electrode 3.

Fourth, the amplitudes of the voltages $e_2$ and $e_4$ should be about equal.

Fifth, the output voltage $e_0$ should be extracted from the second network; shown, in Fig. 1, as extracted across the resistance R, though it may also be extracted across the capacitance $C_2$, with point P a common output terminal. In the latter case, the circuit performs as a low-pass filter.

If these conditions are satisfied, the circuit has been found to produce relatively high Q resonant response, as shown by the solid-line curve of Fig. 2, plotting the ratio of output-to-input voltage $e_0/e_1$ (plotted along the ordinate) as a function of frequency (plotted along the abscissa). The following substantial equality is then obtained:

$$\sqrt{\frac{\mu R}{R+r_p}} \approx \frac{\frac{r_p R}{r_p+R}}{X_1} \approx \frac{R}{X_2}$$

where $\mu$ is the amplification factor of the tube 1, the symbol $\approx$ means approximately equal, $X_1$ is the reactance of $C_1$ at the resonant frequency $f_0$, Fig. 2, and $X_2$ is the corresponding reactance of $C_2$.

Typical values of network elements to achieve the phenomenon of the present invention at, for example, an audio frequency of 1000 cycles, and using a 12AX7 electron tube 1 operating with an amplification factor $\mu$=100, are: $C_1 \approx C_2 \approx 5{,}000$ $\mu\mu$farads; $X_1 \approx X_2 \approx 30$K ohms; R=220K ohms; B+, B—=300 volts; and resistor 8 of 390K ohms.

By connecting the terminal 5 to the tap of a variable impedance, shown as the resistance $R_v$ of Fig. 4, which connects through coupling capacitance C preferably to the upper terminal of the resistance R of the second network, though other points of such connection may be employed, variation of the single control $R_v$ will be found simultaneously to vary the gain and Q of the circuit, as shown by the dotted responses in Fig. 2. One such other point of connection could be the intermediate point I of resistance R, from which point I the output of the circuit may, if desired, also be taken. A very desirable single gain-and-Q control is thus provided in a high input-impedance tuned amplifier that can thus be driven with little power. Under the conditions above specified, indeed, the applied input voltage $e_1$ may be small compared to the actual cathode-to-control electrode voltage $e_2$.

In actual practice, a cathode resistor of about 4.7K ohms, not shown, may be employed to increase linearity, as is well known. None of the grid-return resistor 7, shown dotted, the direct-current-circuit-completing resistor 8 across the capacitance $C_2$, also dotted, or the input coupling capacitor C′, appreciably affects the functioning of this electronic tuned-circuit operation, as above described. If further capacitance, shown dotted at $C_3$ in Fig. 4, is connected as part of a third network across at least part of the networks, shown as connected together with the portion $r$ of the resistance R across $C_1$, and across the remainder of R and $C_2$, it is possible to approach exact amplitude equality between $e_2$ and $e_4$, thus to obtain a large Q and a high amplification.

Other types of electron or similar relays 1 may also be employed, including transistors, and the terms "electron-operated relay" and "anode, cathode and control electrodes," as used in the specification and claims, are intended generically to embrace the corresponding elements of such devices. Thus, in Fig. 3, the base 3′, emitter 4′ and collector 2′ of the transistor relay 1′ serve the same function as the respective control electrode 3, cathode 4 and anode 2 of the electron-tube relay 1 of Fig. 1, and may be generically referred to as control, cathode and anode electrodes. It will be noted that the resistor 7 of Fig. 3 is connected between the base 3′ and the point P; that the emitter 4′ is connected through a resistor 20 to the upper terminal of capacitor $C_2$; and that a feedback resistor 22 is connected from the collector 2′ to the base 3′. For 2N107, 2N238 or 2N405 type transistors 1′, the following circuit values have been found to produce a Q of about 1.15 and a ratio $e_0/e_1$ of about 4.5 at 1000 cycles frequency and with an input resistance of about 4.7K ohms: $C_1=C_2=.047$ $\mu$farad; R=22K ohms; +=17 volts; resistor 7=68K ohms; resistor 20=680 ohms; resistor 8=22K ohms. The large direct-current emitter degeneration provided by resistors 20 and 8 in combination with resistors 22 and 7 provides a large degree of temperature stability. A typical operating $I_{co}$ is about 14 $\mu$amperes at 25° C. The impedance of the base biasing circuit 22, 7 has been made sufficiently low to permit an $I_{co}$ of up to 110 $\mu$amperes before collector-emitter voltage bottoming. This corresponds to a maximum ambient temperature rating of 58° C. Higher Q, gain and temperature stability is easily possible, but the above circuit values have been optimized for high impedance operation. This increases the input resistance and reduces the required value of capacitors for a given frequency.

By providing a load R″, Fig. 3, moreover, that is preferably of value high compared to that of resistance R, and appropriate time constants of the network formed by R″ and the output coupling capacitance C″ to provide a high-pass network, the response shown in Fig. 2 may be carried to the zero point on the left-hand side of the curve. This, of course, may be done in the circuit of Figs. 1 and 4, also. In addition, a plurality of circuits of the type shown in Figs. 1, 3 or 4 may be used, with their respective input terminals and respective output terminals connected in parallel, each tuned to successively different octaves in, for example, the audio-frequency range. The input circuits 5, 6 would be connected to an audio source and the output circuits to an amplifier, not shown, each circuit having its own gain control.

Other types of network energy-storage devices besides capacitors, such as inductors, may also be employed.

Further modifications will also occur to those skilled in the art and all such are considered to fall within the spirit and scope of the invention as defined in the appended claims.

What is claimed is:

1. An electronic tuned circuit having, in combination, an electron-operated relay having at least anode, cathode and control electrodes, a first time-constant-controlled network including the inherent anode-to-cathode resistance in the relay and having a network element connected between the anode and cathode electrodes, a second time-constant-controlled network connected in parallel with the said element, means for applying alternating-current voltage between the control electrode and an intermediate point of the second network, and means for extracting amplified alternating-current voltage from a point of the second network other than the said intermediate point, the values of the time-constant-controlling elements of the networks producing substantially equal phase shifts and substantially equal signal losses in each of the networks and a total phase shift and signal loss such that the voltage measured between the cathode and the said intermediate point of the second network is substantially in phase with and substantialy of equal amplitude to the voltage measured between the cathode and the control electrode, in order that the applied voltage between the control electrode and the said intermediate point may be relatively small compared to the said cathode-to-control electrode voltage.

2. An electronic tuned circuit having, in combination, an electron-operated relay having at least anode, cathode and control electrodes, a first time-constant-controlled network including the inherent anode-to-cathode resistance within the relay and an energy-storage network element, the element being connected between the anode and cathode electrodes, a second time-constant-controlled network including series connected further resistance and a further energy-storage network element, the second network being connected in parallel with the energy-storage element of the first network, means for applying alternating-current voltage between the control electrode and an intermediate point of the second network between the said further resistance and the further energy-storage network element, and means for extracting amplified alternating-current energy from a point of the second network other than the said intermediate point.

3. An electronic tuned circuit having, in combination, an electron-operated relay having at least anode, cathode and control electrodes, a first time-constant-controlled network including the resistance inherent in the flow of electrons to the anode within the relay and an energy-storage network element, the element being connected between the anode and cathode electrodes, a second time-constant-controlled network including series connected further resistance and a further energy-storage network element, the second network being connected in parallel with the energy-storage element of the first network, means for applying alternating-current voltage between the control electrode and an intermediate point of the second network between the said further resistance and the further energy-storage network element, and means for extracting amplified alternating-current energy from a point of the second network, the values of the time-constant-controlling elements of the networks being sufficient to produce substantialy equal phase shifts and substantially equal signal losses in each of the networks and a total phase shift and signal loss such that the voltage measured between the cathode and the said intermediate point of the second network is substantially in phase with and substantially of equal amplitude to the voltage measured between the cathode and the control electrode, in order that the applied voltage between the control electrode and the said intermediate point may be relatively small compared to the said cathode-to-control electrode voltage.

4. An electronic tuned circuit having, in combination, an electron-operated relay of gain $\mu$ having at least anode, cathode and control electrodes, a first time-constant-controlled network including the resistance $r_p$ inherent in the flow of electrons to the anode within the relay and an energy-storage network element of impedance $X_1$ at the resonant frequency of the tuned circuit, the element being connected between the anode and cathode electrodes, a second time-constant-controlled network including series connected further resistance R and a further energy-storage network element of impedance $X_2$ at the said resonant frequency, the second network being connected in parallel with the energy-storage element of the first network, means for applying alternating-current voltage between the control electrode and an intermediate point of the second network between the said further resistance and the further energy-storage network element, and means for extracting amplified alternating-current energy from a point of the second network, the value of the network elements being such as to satisfy the following relationship:

$$\sqrt{\frac{\mu R}{R+r_p}} \approx \frac{\frac{r_p R}{r_p+R}}{X_1} \approx \frac{R}{X_2}$$

5. An electronic tuned circuit as claimed in claim 4 and in which the applying means is connected to a source of audio-frequency voltage.

6. An electronic tuned circuit as claimed in claim 5 and in which the said energy-storage elements are capacitors.

7. An electronic tuned circuit as claimed in claim 5 and in which there is provided in the voltage applying means a variable impedance connected to a point of one of the networks, the variation of the variable impedance simultaneously varying the gain and the Q of the circuit.

8. An electronic tuned circuit as claimed in claim 7 and in which the said variable impedance comprises a variable resistance and the said point is common to the said second network.

9. An electronic tuned circuit as claimed in claim 2 and in which the said extracting means is connected to the said intermediate point.

10. An electronic tuned circuit as claimed in claim 3 and in which a further energy-storage element is connected in a further network across at least part of the second network to assist in rendering the said cathode-to-intermediate-point voltage of amplitude substantially equal to the said cathode-to-control-electrode voltage.

11. An electronic tuned circuit having, in combination, a transistor relay having at least collector, emitter and base electrodes, a first time-constant-controlled network having a network element connected between the collector and emitter electrodes, a second time-constant-controlled network connected in parallel with the said element, means for applying alternating-current voltage between the base electrode and an intermediate point of the second network, and means for extracting amplified alternating-current voltage from a point of the second network, the values of the time-constant-controlling elements of the networks being sufficient to produce substantially equal phase shifts and substantially equal signal losses in each of the networks and a total phase shift and signal loss such that the voltage measured between the emitter and the said intermediate point of the second network is substantially in phase with and substantially of equal amplitude to the voltage measured between the emitter and the base electrode, in order that the applied voltage between the base electrode and the said intermediate point may be relatively small compared to the said emitter-to-base electrode voltage.

12. An electronic tuned circuit having, in combination, a transistor relay of amplification factor $\mu$ having at least collector, emitter and base electrodes, a first time-constant-controlled network including the resistance $r_p$ inherent in the flow of current to the collector within the relay and an energy-storage network element of impedance $X_1$ at the resonant frequency of the tuned circuit, the element being connected between the collector and emitter electrodes, a second time-constant-controlled network including series connected further resistance R and a further energy-storage network element of impedance $X_2$ at the said resonant frequency, the second network being connected in parallel with the energy-storage element of the first network, means for applying alternating-current voltage between the base electrode and an intermediate point of the second network between the said further resistance and the further energy-storage network element, and means for extracting amplified alternating-current energy from a point of the second network, the value of the network elements being such as to satisfy the following relationship:

$$\sqrt{\frac{\mu R}{R+r_p}} \approx \frac{\frac{r_p R}{r_p+R}}{X_1} \approx \frac{R}{X_2}$$

13. An electronic tuned circuit as claimed in claim 12 and in which the applying means is connected to a source of audio-frequency voltage.

14. An electronic tuned circuit as claimed in claim 13 and in which the said energy-storage elements are capacitors.

15. An electronic tuned circuit as claimed in claim 1, and in which the applying means is connected to a source of audio-frequency voltage.

References Cited in the file of this patent

UNITED STATES PATENTS

| | | |
|---|---|---|
| 2,270,405 | Black | Jan. 20, 1942 |
| 2,688,692 | Glaisher | Sept. 7, 1954 |
| 2,823,312 | Keonjian | Feb. 11, 1958 |